United States Patent
Katsuki et al.

(10) Patent No.: US 11,200,357 B2
(45) Date of Patent: *Dec. 14, 2021

(54) PREDICTING TARGET CHARACTERISTIC DATA

(71) Applicant: INTERNATIONAL BUSINESS MACHINES CORPORATION, Armonk, NY (US)

(72) Inventors: Takayuki Katsuki, Tokyo (JP); Rudy Raymond Harry Putra, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/742,170

(22) Filed: Jan. 14, 2020

(65) Prior Publication Data

US 2020/0151374 A1     May 14, 2020

Related U.S. Application Data

(63) Continuation of application No. 14/984,794, filed on Dec. 30, 2015, now Pat. No. 10,599,788.

(51) Int. Cl.
*G06F 30/20* (2020.01)
*G06F 17/10* (2006.01)
(Continued)

(52) U.S. Cl.
CPC .............. *G06F 30/20* (2020.01); *G06F 17/10* (2013.01); *G06F 30/15* (2020.01); *G06F 2111/10* (2020.01)

(58) Field of Classification Search
CPC .......... G06F 30/20; G06F 17/10; G06F 30/15; G06F 2111/10
See application file for complete search history.

(56) References Cited

U.S. PATENT DOCUMENTS 7,158,923 B1    1/2007    Murthy et al.
7,409,371 B1    8/2008    Heckerman et al.
(Continued)

FOREIGN PATENT DOCUMENTS

CN      104866679 A     8/2015
CN      104933271 A     9/2015
(Continued)

OTHER PUBLICATIONS

Hilton, Harry H., and Morris Feigen. "Minimum weight analysis based on structural reliability." Journal of the Aerospace Sciences 27.9 (1960): 641-652.*

(Continued)

*Primary Examiner* — Saif A Alhija
(74) *Attorney, Agent, or Firm* — Tutunjian & Bitetto, P.C.; Randall Bluestone

(57) ABSTRACT

Target characteristic data may be predicted using an apparatus including a processor and one or more computer readable mediums collectively including instructions. When executed by the processor, the instructions cause the processor to obtain a plurality of physical structure data and a plurality of characteristic data, estimate at least one structural similarity between at least two physical structures that correspond with physical structure data among the plurality of physical structure data, and generate an estimation model for estimating a target characteristic data from a target physical structure data by using at least one characteristic data and corresponding at least one structural similarity between the target physical structure data and each of the plurality of the physical structure data.

18 Claims, 8 Drawing Sheets

(51) Int. Cl.
G06F 30/15 (2020.01)
G06F 111/10 (2020.01)

(56) References Cited

U.S. PATENT DOCUMENTS

| | | |
|---|---|---|
| 7,908,123 B2 | 3/2011 | Maebayashi et al. |
| 2003/0028325 A1 | 2/2003 | Roggero et al. |
| 2006/0101060 A1 | 5/2006 | Li et al. |

FOREIGN PATENT DOCUMENTS

| | | |
|---|---|---|
| EP | 2133822 A1 | 12/2009 |
| JP | H02228763 A | 9/1990 |
| JP | 2007164393 A | 6/2007 |
| JP | 2009258879 A | 11/2009 |
| JP | 2012181669 A | 9/2012 |
| JP | 2014006813 A | 1/2014 |

OTHER PUBLICATIONS

List of IBM Patents or Patent Applications Treated as Related dated Jan. 14, 2020, 2 pages.
International Search Report and Written Opinion issued in International Application No. PCT/IB2016/057825 dated Apr. 19, 2017, pp. 1-10.
Japanese Office Action issued on related application No. 2018-533932 dated Jul. 28, 2020, 6 pages.

* cited by examiner $$X_i = \begin{pmatrix} s_{i1} \\ s_{i2} \\ \vdots \\ s_{iS} \\ p_{i1} \\ p_{i2} \\ \vdots \\ p_{iP} \\ t \end{pmatrix} \begin{matrix} \left.\vphantom{\begin{matrix}s_{i1}\\s_{i2}\\\vdots\\s_{iS}\end{matrix}}\right\} Xs_i \\ \left.\vphantom{\begin{matrix}p_{i1}\\p_{i2}\\\vdots\\p_{iP}\end{matrix}}\right\} Xp_i \end{matrix}$$

*FIG.5*

$$Y_i = \begin{pmatrix} y_{i1} \\ y_{i2} \\ \vdots \\ y_{iT} \end{pmatrix}$$

*FIG.6*

$$\phi(X_i) = \begin{pmatrix} K(V(X_i, X_1)) \\ K(V(X_i, X_2)) \\ K(V(X_i, X_3)) \\ \vdots \\ K(V(X_i, X_n)) \\ \vdots \\ K(V(X_i, X_N)) \end{pmatrix}$$

$$V(X_i, X_n) = \begin{Bmatrix} \theta_1 L_{\{1,1\}}(X_i, X_n), \\ \theta_2 L_{\{1,2\}}(X_i, X_n), \\ \vdots \\ \theta_{D1} L_{\{1,D1\}}(X_i, X_n), \\ \theta_{\{D1+1\}} L_{\{2,1\}}(X_i, X_n), \\ \theta_{\{D1+2\}} L_{\{2,2\}}(X_i, X_n), \\ \vdots \\ \theta_{\{D1+D2\}} L_{\{2,D2\}}(X_i, X_n), \end{Bmatrix}$$

FIG.9

PREDICTING TARGET CHARACTERISTIC DATA

BACKGROUND

Technical Field

The present invention relates to predicting target characteristic data.

Related Art

Computer aided engineering (CAE) has been utilized for a variety of manufacturing industries such as cars and electronic appliances. For example, design of car hoods is one of the applications of CAE. Strict regulations are being imposed on designs of car hoods so as to satisfy safety standards (e.g., injury scores on head-hood impacts). The injury scores are computed from acceleration-time curves during head-hood impacts. The acceleration time-curves can be measured from expensive physical crash tests, or estimated from relatively cheap computer simulations of crashes. However, it currently takes a long time to estimate an accelerating-time curve based on a computer simulation of a crash due to the large amount of memory and processor required to simulate a crash.

SUMMARY

Therefore, it is an object of an aspect of the innovations herein to predict target characteristic data in a manner capable of overcoming the above drawbacks accompanying the related art. The above and other objects can be achieved by combinations described in the claims. A first aspect of the innovations may be an apparatus including a processor and one or more computer readable mediums collectively including instructions. When executed by the processor, the instructions may cause the processor to obtain a plurality of physical structure data and a plurality of characteristic data, wherein each physical structure corresponds a characteristic data among the plurality of characteristic data and characteristic data includes a plurality of characteristic values, each characteristic value being related to a physical structure that corresponds with a physical structure data among the plurality of physical structure data, estimate at least one structural similarity between at least two physical structures that correspond with physical structure data among the plurality of physical structure data, and generate an estimation model for estimating a target characteristic data from a target physical structure data by using at least one characteristic data and corresponding at least one structural similarity between the target physical structure data and each of the plurality of the physical structure data. According to a first aspect of the innovations, an apparatus may directly estimate characteristic data, such as an acceleration-time curve, from physical structure data, without simulating the crash.

The first aspect may also be a computer-implemented method that performs the operations of the apparatus, or a computer program product comprising a computer readable storage medium having program instructions embodied therewith, the program instructions executable to perform the operations of the apparatus.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 shows one example of physical structure data $X_i$, according to an embodiment of the present invention.

FIG. 6 shows one example of characteristic data $Y_i$, according to an embodiment of the present invention.

FIG. 9 shows one example of $V(X_i, X_n)$, according to an embodiment of the present invention.

DETAILED DESCRIPTION

Hereinafter, some embodiments of the present invention will be described. The embodiments do not limit the invention according to the claims, and the combinations of features described in the embodiments are not necessarily essential to means provided by aspects of the invention.

Figure 1:
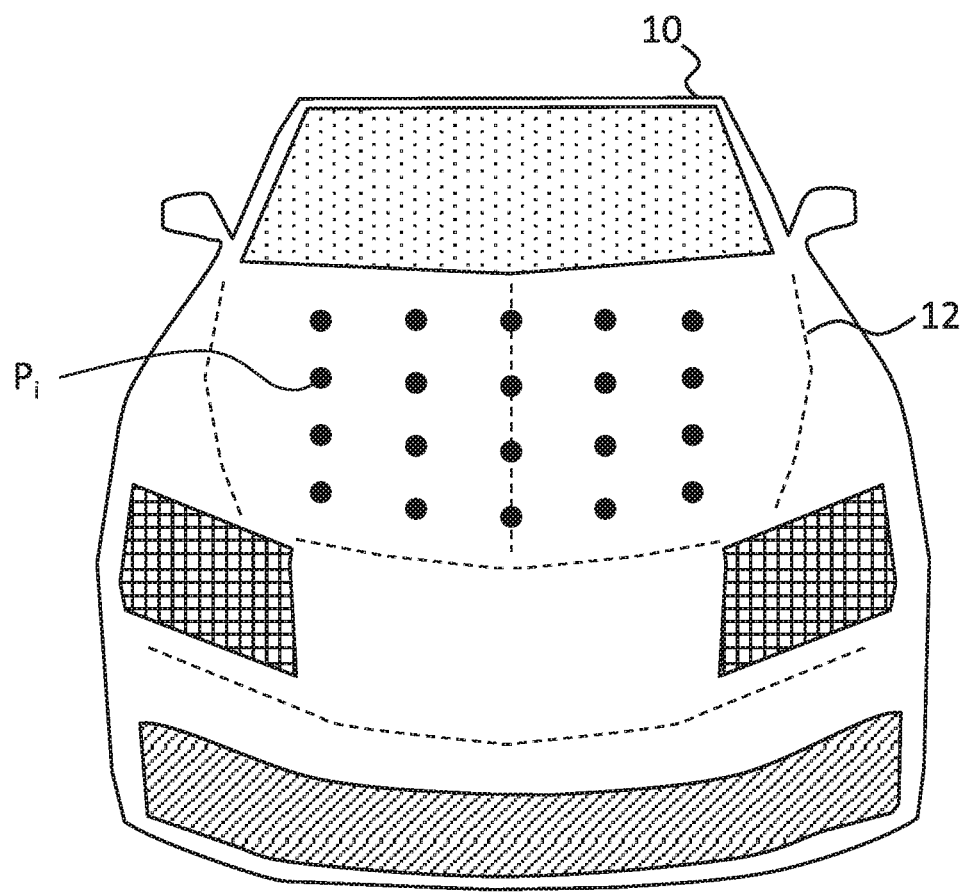
FIG. 1 shows an application of target characteristic data prediction, according to an embodiment of the present invention.

FIG. 1 shows an application of target characteristic data prediction, according to an embodiment of the present invention. A target characteristic data predicting apparatus may generate an estimation model for estimating target characteristic data from target physical structure data of a physical structure. The estimation model may be generated by utilizing training data of physical structures having measured characteristic data. Each physical structure of the training data may represent a part of a body of a mobile object, such as a car hood 12 of a car 10 shown in FIG. 1.

In the embodiment of FIG. 1, the car hood 12 has 20 points, a target characteristic data predicting apparatus may input physical structure data of these 20 points, and may output target characteristic data for these 20 points. One of the 20 points is indicated as a point $P_i$ in FIG. 1. In one embodiment, the apparatus may use physical structure data Xi of the point $P_i$ and output characteristic data $Y_i$ of the point $P_i$.

Figure 2:
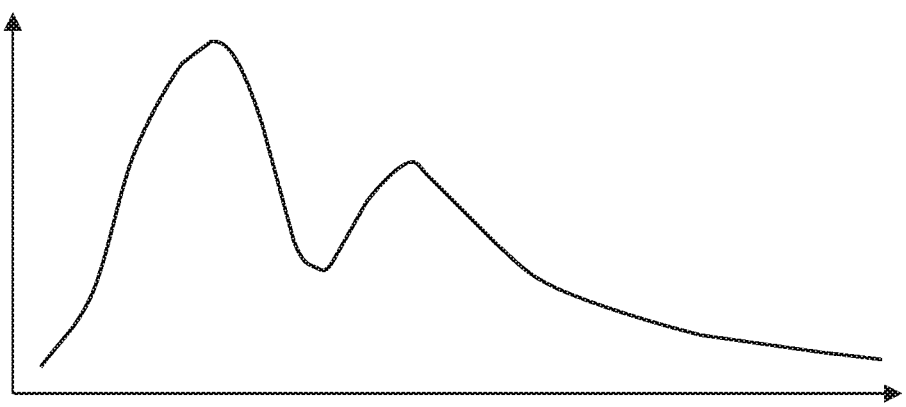
FIG. 2 shows an acceleration-time curve estimated by predicting target characteristic data, according to an embodiment of the present invention.

FIG. 2 shows an acceleration-time curve utilized for predicting target characteristic data, according to an embodiment of the present invention. A target characteristic data predicting apparatus may estimate an acceleration-time curve by utilizing training data, such as the acceleration-time curve shown in FIG. 2. For example, the apparatus may output the acceleration-time curves during a crash for the 20 points in FIG. 1 based on the estimation model, without conducting the physical crash test or the computer simulation.

Figure 3:
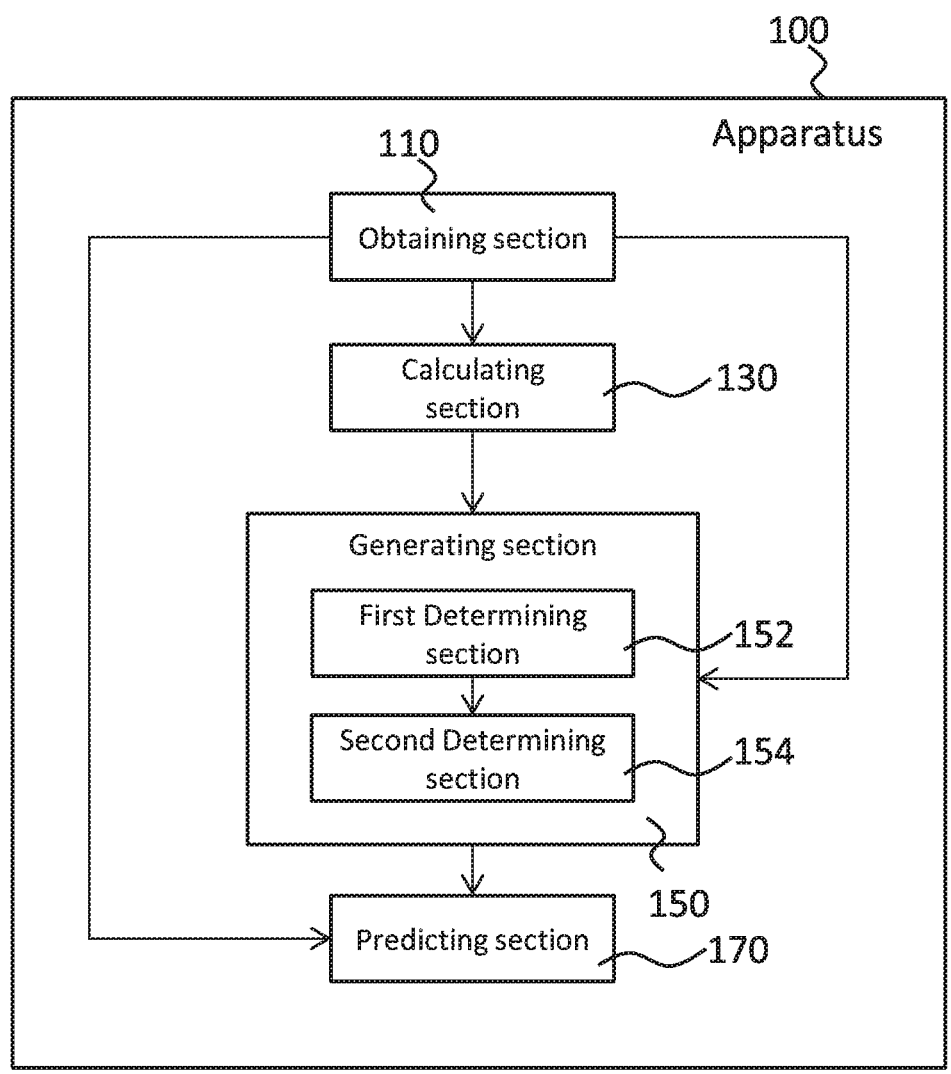
FIG. 3 shows an exemplary configuration of an apparatus 100, according to an embodiment of the present invention.

FIG. 3 shows a block diagram of an apparatus 100, according to an embodiment of the present invention. The apparatus 100 may generate an estimation model and predict target characteristic data based on the estimation model. The apparatus 100 may comprise a processor and one or more computer readable mediums collectively including instructions. The instructions, when executed by the processor, may cause the processor to operate as a plurality of operation sections. Thereby, the apparatus 100 may be regarded as comprising an obtaining section 110, a calculating section 130, a generating section 150, and a predicting section 170.

The obtaining section 110 may obtain a plurality of physical structure data, such as the physical structure data of the car hood 12 shown in FIG. 1, and a plurality of characteristic data, such as the acceleration-time curve shown in FIG. 2, as a training data. The obtaining section 110 may provide the generating section 150 with the plurality of physical structure data, and provide the calculating section 130 with the plurality of characteristic data, as the training data.

The obtaining section 110 may also obtain a new target physical structure data, and provide the predicting section 170 with the new target physical structure data for prediction of the estimation model.

The calculating section 130 may calculate a characteristic similarity between a first characteristic data and a second characteristic data among the plurality of characteristic data. The calculating section 130 may calculate one or more of the characteristic similarities among a plurality of pairs of characteristic data among the plurality of the characteristic data. The calculating section 130 may provide the generating section 150 with the calculated characteristic similarities.

The generating section 150 may generate an estimation model for estimating a target characteristic data from a target physical structure data. The generating section 150 may comprise a first determining section 152 and a second determining section 154.

The first determining section 152 may conduct a first learning to determine a similarity function that estimates a similarity between two physical structures of the two physical structure data.

The first determining section 152 may also estimate at least one structural similarity between at least two physical structures that correspond with physical structure data among the plurality of physical structure data, based on the similarity function determined by the first learning. The first determining section 152 may provide the second determining section 154 with one or more of the estimated structural similarities.

The second determining section 154 may conduct a second learning to generate the estimation model. The estimation model may include having a weight and sensitivity, and the second determining section 154 may optimize the weight and sensitivity in the second learning. The second determining section 154 may provide the predicting section 170 with the generated estimation model.

The predicting section 170 may estimate a target characteristic data of a new target physical structure by using the estimation model. In one embodiment, the predicting section 170 may perform the estimation based on the estimation model by using at least one structural similarity between the target physical structure data and each of the plurality of the physical structure data in the training data. In one embodiment, the predicting section 170 may input the new target physical structure data and estimate the characteristic data corresponding to the new target physical structure data, based on the estimation model.

As described above, the apparatus 100 can estimate characteristic data based on physical structure data by performing the first learning and the second learning, without actually generating a computer simulation of the physical structure data, thereby reducing cost and time for manufacturing products, such as cars.

Figure 4:
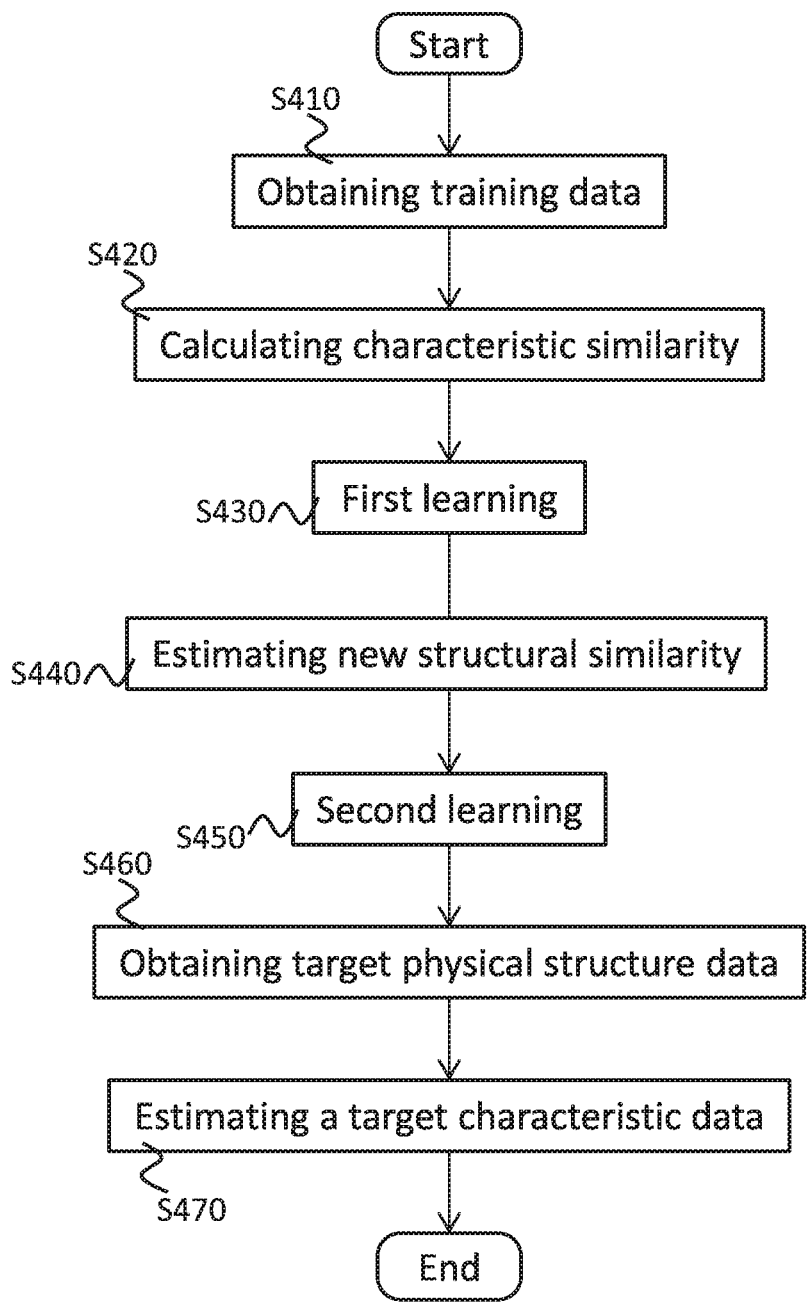
FIG. 4 shows an operational flow of an apparatus, according to an embodiment of the present invention.

FIG. 4 shows an operational flow of an apparatus, according to an embodiment of the present invention. The present embodiment describes an example in which an apparatus, such as the apparatus 100, performs the operations from S410 to S470, as shown in FIG. 4. FIG. 4 shows one example of the operational flow of the apparatus 100 shown in FIG. 3, but the apparatus 100 shown in FIG. 3 is not limited to using this operational flow.

First, at S410, an obtaining section, such as the obtaining section 110, may obtain training data from a memory of the apparatus or a database outside the apparatus. The training data may include data of a plurality of points in a physical structure, such as a car hood. Data of each point may include physical structure data and characteristic data.

The obtaining section may provide the generating section with the plurality of the physical structure data, and provide the calculating section with the plurality of the characteristic data.

Next, at S420, a calculating section, such as the calculating section 130, may calculate a characteristic similarity between a first characteristic data and a second characteristic data among the plurality of characteristic data. The calculating section may generate all possible pairs or some of the all possible pairs from the plurality of characteristic data, and calculate the characteristic similarity of each of the two characteristic data in each of the pairs. In one embodiment, the calculating section may calculate a characteristic similarity of the characteristic data $Y_1$ and $Y_2$ (which may be referred to as $S(Y_1, Y_2)$), a characteristic similarity $S(Y_1, Y_3)$, a characteristic similarity $S(Y_1, Y_4)$, . . . , a characteristic similarity $S(Y_{N-2}, Y_N)$, a characteristic similarity $S(Y_{N-1}, Y_N)$, wherein a variable N represents a number of training data, such as a number of points of the car hood(s).

The calculating section may perform the calculation based on at least one difference between corresponding characteristic values of the first characteristic data and the second characteristic data. In one embodiment, the calculating section may calculate the characteristic similarity $S(Y_i, Y_j)$ by calculating the Euclidean distance between vectors $Y_i$ and $Y_j$. The calculating section may provide the generating section with the calculated characteristic similarities.

Next, at S430, a first determining section, such as the first determining section 152, may conduct a first learning to determine the similarity function for estimating a new structural similarity of two physical structures of the physical structure data.

Next, at S440, the first determining section may estimate structural similarity of the physical structures corresponding physical structure data among the plurality of physical structure data based on the learned similarity function. Thereby the first determining section can perform the estimation based on at least one characteristic similarity between characteristic data that corresponds with the at least two physical structures.

The first determining section may estimate the structural similarities of pairs of physical structure vectors (e.g., a pair $(Xs_1, Xs_2)$, a pair $(Xs_1, Xs_3)$, a pair $(Xs_1, Xs_4)$, . . . , a pair $(Xs_{N-2}, Xs_N)$, a pair $(Xs_{N-1}, Xs_N)$) by calculating output values of the similarity function $L_1(Xs_1, Xs_2)$, $L_1(Xs_1, Xs_3)$, $L_1(Xs_1, Xs_4)$, . . . , $L_1(Xs_{N-2}, Xs_N)$, $L_1(Xs_{N-1}, Xs_N)$. The first determining section may provide the second determining section with the estimated structural similarities.

Next, at S450, the second determining section, such as the second determining section 154, may conduct a second learning to determine a prediction function for estimating the characteristic data from the physical structure. In the second learning, the second determining section 154 may optimize an objective function as shown in formula (1):

$$Arg \min \Sigma_t^T \Sigma_i^N L_2(y_{it} - \varphi(X_i)^T \omega)^2 + \lambda |\omega|^2 \quad \text{formula (1)}$$

where $\varphi(\cdot)$ is a function that represents a type of Gaussian kernel, $\omega$ is a weight vector including a plurality of weight variables, $\lambda$ is a regularization term (e.g., a L2 regularization term), $y_{it}$ is a target characteristic value of a target characteristic data $Y_i$.

As explained above, the second determining section may determine the prediction function that outputs a plurality of values, such as acceleration values in the acceleration-time curve of an object that hits each point. In other words, the second determining section performs a multi-label liner regression. The second determining section may provide the predicting section with the estimation model.

Next, at S460, the obtaining section may obtain a new target physical structure data for predicting a target characteristic data. In one embodiment, the obtaining section may obtain a new target physical structure data $X_{i'}$ of a new target car hood. The obtaining section may provide the predicting section with the new target physical structure data.

Next, at S470, the predicting section, such as the predicting section 170, may estimate characteristic data of the new target physical structure' by using the estimation model. In one embodiment, the predicting section may estimate the characteristic data $Y_{i'}$ of the new target physical structure data $X_{i'}$ by inputting $X_{i'}$ and values of the time variable t into the estimation model $\varphi(X_i)^T \omega$. The estimated characteristic data $Y_{i'}$ may include characteristic values, each corresponding to an acceleration value with respect to the time tin an acceleration-time curve.

FIG. 5 shows one example of the physical structure data $X_i$, according to an embodiment of the present invention. Each physical structure data of the plurality of physical structure data obtained by an obtaining section, such as the obtaining section 110, may include a feature representing physical structure of a point of a physical structure, a feature representing location (e.g., absolute position or relative position) of the point of the physical structure, etc and time.

In the embodiment, of FIG. 5, the physical structure data $X_i$ may correspond to the point $P_i$ in the car hood of FIG. 1 and may be represented by a vector including scalar values $s_{i1}, s_{i2}, \ldots, s_{iS}, p_{i1}, p_{i2}, \ldots, p_{iP}$, and t. The scalar values $s_{i1}, s_{i2}, \ldots, s_{iS}$ may represent a shape around the point $P_i$ in the car hood. In one embodiment, the scalar values $s_{i1}, s_{i2}, \ldots, s_{iS}$ may be values representing a relative height of S points (e.g., 10 points) in the car hood around the point $P_i$. The scalar values $s_{i1}, s_{i2}, \ldots, s_{iS}$ may form a vector $Xs_i$.

The scalar values $p_{i1}, p_{i2}, \ldots, p_{iP}$ may be values representing a location of the point $P_i$. In one embodiment, a value of P may be 3, and $p_{i1}$, may correspond to a relative location in a first dimension (x-axis) of the point $P_i$, $p_{i2}$ may correspond to a relative location in a second dimension (y-axis) of the point $P_i$, and $p_{i3}$ may correspond to a relative location in a third dimension (z-axis) of the point $P_i$.

The scalar values $p_{i1}, p_{i2}, p_{i3}$ and t may form a location vector $Xp_i$. In addition to or instead of $Xs_i$ and/or $Xp_i$, the obtaining section may obtain the physical structure data including values representing other features of the point $P_i$, such as thickness of one or more of points in the car hood around the point $P_i$. The scalar value t may correspond to time. The plurality of time at which acceleration values are obtained in the acceleration-time curve may correspond to a variable t in $Xp_i$. In other words, the first determining section may prepare a plurality of $Xp_i$ having different value of time t for each acceleration-time curve, and each value of time t corresponds to the time at which an acceleration value is obtained in the acceleration-time curve.

FIG. 6 shows one example of the characteristic data $Y_i$. Each characteristic data of the plurality of characteristic data may correspond to a physical structure among the plurality of physical structures. Each characteristic data may include at least one characteristic value among the plurality of characteristic values that represents a change of a characteristic relating to time. The change of a characteristic relating to time may be a characteristic relating to an impact against the corresponding physical structure (e.g., an acceleration of an object hitting a point of physical structure), or representing a transformation of the corresponding physical structure.

In one embodiment, the characteristic data $Y_i$ corresponds to the physical structure data $X_i$. For example, each characteristic data $Y_i$ may represent a vector including a plurality of characteristic values $y_{i1}, y_{i2}, \ldots,$ and $y_{iT}$. Each characteristic value $y_{it}$ of the characteristic data $Y_i$ may represent a characteristic of a physical structure that corresponds with a physical structure data $X_i$ among the plurality of physical structure data.

In one embodiment, the characteristic data $Y_i$ may correspond to acceleration values in the acceleration-time curve of the point $P_i$ having the physical structure data $X_i$, as shown in FIG. 2. In the embodiment, each of characteristic values $y_{i1}, y_{i2}, \ldots, y_{iT}$ corresponds to a value of acceleration of the point Pi at each time $t_1, t_2, \ldots, t_T$.

Figures 7, 8:
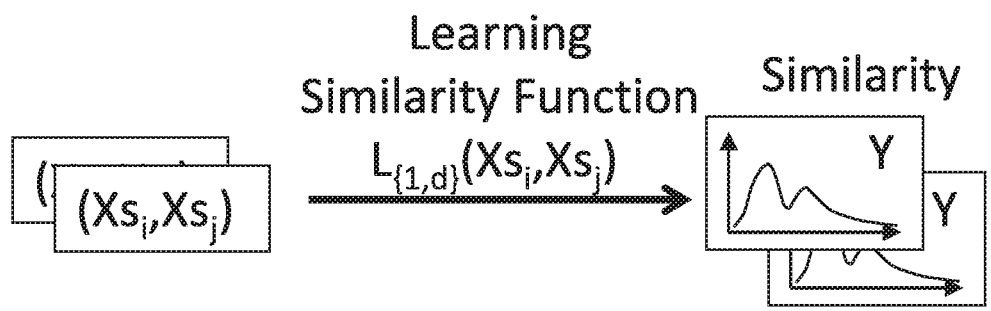
FIG. 7 shows one example of first learning, according to an embodiment of the present invention.
FIG. 8 shows one example of $\varphi(X_i)$, according to an embodiment of the present invention.

FIG. 7 shows one example of the first learning. The first determining section may learn a similarity function $L_{\{1,d\}}(\cdot, \cdot)$. In one embodiment, the similarity function $L_{\{1,d\}}(Xs_i, Xs_j)$ estimates the structural similarity between a vector $Xs_i$ of the physical structure data $X_i$ and a vector $Xs_j$ of the physical structure data $X_j$. The first determining section may learn the similarity function $L_{\{1,d\}}(\cdot, \cdot)$ such that output values of the similarity function $L_{\{1,d\}}(Xs_i, Xs_j)$ match with the similarity of the characteristic data $(Y_a, Y_b)$, which corresponds to the physical structure data $(Xs_a, Xs_b)$.

For the first learning, the first determining section may first generate a plurality of pairs of vectors of Xs from the plurality of physical structure data in the training data that correspond to the pairs of the characteristic data generated at S420. In one embodiment, the first determining section may generate a pair $(Xs_1, Xs_2)$, a pair $(Xs_1, Xs_3)$, a pair $(Xs_1, Xs_4), \ldots,$ a pair $(Xs_{N-2}, Xs_N)$, a pair $(Xs_{N-1}, Xs_N)$.

Then, the first determining section may determine the similarity function for estimating a new structural similarity based on the at least one structural similarity. In one embodiment, the first determining section may determine the similarity function based on at least one characteristic similarity between characteristic data that corresponds with the at least two physical structures. In the embodiment, the first determining section may determine D kinds of the similarity function $L_{\{1,1\}}(Xs_i, Xs_j), L_{\{1,2\}}(Xs_i, Xs_j), \ldots, L_{\{1,D\}}(Xs_i, Xs_j)$ using formula (2) as shown below:

$$L_{\{1,d\}}(Xs_i, Xs_j) = \Sigma_c g_{c,d}(Xs_i, Xs_j) \cdot f_{c,d}(Y_{train}) \quad \text{formula (2)}$$

where c is a variable that represents perspective of the similarity, $g_{c,d}(\cdot, \cdot)$ is a function that generates a division rule of the tree model based on input vectors, and $f_{c,d}(Y_{train})$ is a function that brings out two characteristic data, wherein those two characteristic data correspond to $Xs_i$ and $Xs_j$ and are brought out in the viewpoint of the perspective of the similarity c.

In one embodiment, the function $g_{c,d}(Xs_i, Xs_j)$ evaluates the similarity of $Xs_i$ and $Xs_j$ in a perspective of similarity represented by a value of the variable c. Therefore, the function $g_{c,d}(Xs_i, Xs_j)$ evaluates the similarity of $Xs_i$ and $Xs_j$ in different perspectives for each value of the variable c.

The function $g_{c,d}(Xs_i, Xs_j)$ may evaluate the similarity of a subset of variables among scaler variables in the vectors $Xs_i$ and $Xs_j$. In one embodiment, the function $g_{1,d}(Xs_i, Xs_j)$ may evaluate the similarity of the first 3 variables in the vectors $Xs_i$ and $Xs_j$ (i.e., $s_{i1}, s_{i2}, s_{i3}$ in $Xs_i$ and $s_{j1}, s_{j2}, s_{j3}$ in $Xs_j$). The function $g_{2,d}(Xs_i, Xs_j)$ may evaluate the similarity of the next 3 variables in the vectors $Xs_i$ and $X_{sj}$ (i.e., $s_{i4}, s_{i5}, s_{i6}$ in $Xs_i$ and $s_{j4}, s_{j5}, s_{j6}$ in $Xs_j$). Thereby, the functions $g_{1,d}(Xs_i, Xs_j), g_{2,d}(Xs_i, Xs_j), \ldots, g_{C,d}(Xs_i, Xs_j)$ evaluate the vectors $Xs_i, Xs_j$ in different C perspectives.

In the embodiment, if $s_{i1}, s_{i2}, s_{i3}$ in $Xs_i$ and $s_{j1}, s_{j2}, s_{j3}$ in $Xs_j$ are determined to be similar, then the function $g_{1,d}(Xs_i, Xs_j)$ may output 1, and other functions $g_{2,d}(Xs_i, Xs_j), g_{3,d}(Xs_i, Xs_j), \ldots, g_{C,d}(Xs_i, Xs_j)$ may output 0. And if $s_{i4}, s_{i5}, s_{i6}$ in $Xs_i$ and $s_{j4}, s_{j5}, s_{j6}$ in $Xs_j$ are determined to be similar based on the tree model, then the function $g_{2,d}(Xs_i, Xs_j)$ may output 1, and other functions $g_{1,d}(Xs_i, Xs_j), g_{3,d}(Xs_i, Xs_j), \ldots, g_{C,d}(Xs_i, Xs_j)$ may output 0.

The first determining section may determine functions $g_{c,d}(\bullet, \bullet)$ in the first learning. The first determining section may determine functions $g_{c,d}(\bullet, \bullet)$ of the similarity function $L_1(\bullet, \bullet)$ by using a non-linear model (e.g., a tree model). The first determining section may use a neural network model instead of the tree model.

The function $f_{c,d}(Y_{train})$ firstly brings out, from a plurality of characteristic data of input training data $Y_{train}$ (e.g., all characteristic data $Y_1, Y_2, \ldots, Y_N$), two characteristic data (e.g., $Y_a$ and $Y_b$) of which two corresponding physical structure data (e.g., $X_a$ and $X_b$) are evaluated as being similar by the corresponding function $g_{c,d}(X_a, X_b)$, and then evaluates the similarity of these two characteristic data $Y_a$ and $Y_b$.

FIG. 8 shows one example of $\varphi(X_1)$. As shown in FIG. 8, $\varphi(X_i)$ is a function that inputs the physical structure data $X_i$, and outputs a vector having a plurality of values estimated based on $X_i$. As shown in FIG. 8, the vector of $\varphi(X_i)$ may include output values of the similarity functions $K(\bullet, \bullet)$ of an input vector $V(X_i, X_n)$ of the physical structure data $X_i$ and each of the physical structure data $X_1, \ldots, X_N$ in the training data. The first determining section may prepare D kinds of $g_{c,d}(\bullet, \bullet)$ functions and $f_{c,d}(Y_{train})$ functions and thereby determining D kinds of the similarity functions.

FIG. 9 shows one example of $V(X_i, X_n)$, according to an embodiment of the present invention. As shown in FIG. 9, $V(X_i, X_n)$ may input $X_i$ and $X_n$, and output a vector including elements of output values of functions $\theta_1 \times L_{\{1,1\}}(X_i,X_n), \theta_2 \times L_{\{1,2\}}(X_i,X_n), \ldots, \theta_{D1} \times L_{\{1,D1\}}(X_i,X_n)$ and output values of functions $\theta_{\{D1+1\}} \times L_{\{2,1\}}(X_i,X_n), \theta_{\{D1+2\}} \times L_{\{2,2\}}(X_i,X_n), \ldots, \theta_{\{D1+D2\}} \times L_{\{2,D2\}}(X_i,X_n)$.

In one embodiment, the d1-th function $L_{\{1,d1\}}(X_i,X_n)$ in the $V(X_i, X_n)$ may correspond to $L_{\{1,d1\}}(Xs_i, Xs_j)$ of the formula (2).

The $\{D1+d2\}$-th function $L_{\{2,d2\}}(X_i,X_n)$ in the $V(X_i, X_n)$ may be a mean squared error function or an absolute error function of values of the location vectors $Xp_i$ and $Xp_n$, and may be represented as shown below:

$$L_{\{2,d2\}}(X_i,X_n)=(Xp_i-Xp_n)^2 \qquad \text{formula (4)}.$$

Alternatively, function $L_{\{2,d2\}}(X_i,X_n)$ may be:

$$L_{\{2,d2\}}(X_i,X_n)=|Xp_i-Xp_n| \qquad \text{formula (5)}.$$

Other implementation of D2 kinds of functions $L_{\{2,d2\}}$ is also possible. The variables $\theta_1, \theta_2, \ldots, \theta_{D1}, \theta_{D1+1}, \ldots, \theta_{D1+d2}$ represent sensitivity of each element in the vector $V(X_i, X_n)$. The generating section may also learn the D1+D2 variables $\theta$. As described, the generating section provides D1 kinds of $L_{\{1,d1\}}$ functions and D2 kinds of $L_{\{2,d2\}}$ functions.

The vector $\varphi(X_i)$ may be represented by:

$$\varphi(X_i)=\theta_0 \exp[-\tfrac{1}{2} \times \Sigma_{\{j,k,d\}}(\theta_d \times L_{\{j,k\}}(X_i,X_j))] \qquad \text{formula (6)}.$$

The weight vector w includes weight variables that correspond to each of the functions $K(V(X_i, X_n))$. In one embodiment, the weight variables $w_1, w_2, \ldots, w_N$ correspond to $K(V(X_i, X_1)), K(V(X_i, X_2)), \ldots, K(V(X_i, X_N))$.

The second determining section may determine the weight $\omega$ and sensitivities $\theta$ of an estimated characteristic value to decrease a difference between the estimated characteristic value $\varphi(X_i)^T \omega$ and a target characteristic value $y_{it}$ of a target characteristic data $Y_i$ by using the formula (1). The function $L_2(\bullet)$ in the objective function in the formula (1) may be a loss function such as a mean squared error function or an absolute error function.

During the second learning, the second determining section may learn values of the weight vector $\omega$ and values of parameters $\theta_0, \theta_1, \ldots, \theta_{D1}, \ldots, \theta_{\{D1+D2\}}$ in $\varphi(X_i)$. The second determining section may determine the weight vector $\omega$ and the values of parameters $\theta_0, \theta_1, \ldots, \theta_{\{D1+D2\}}$ in an alternative manner. The second determining section may determine the weight by using a kernel method (such as ARD kernel) and a ridge regression. In other embodiments, the weight vector may include any number of weights.

The second determining section may use $\varphi(X_i)^T \omega$ in the optimized result of the formula (1), as the estimation model. Since the $\varphi(X_i)$ represents a composition of a plurality of structural similarities of the target physical structure data with each physical structure data of the plurality of physical structure data and a composition of the plurality of relative positions between the target structure and each physical structure, the characteristic value may be estimated based on these compositions by the estimation model.

As explained above relating to the operational flow of FIGS. 4-8, the apparatus can estimate a high level feature (such as the acceleration-time curve) from a low level feature (such as shape of the car hood), by utilizing a hierarchical model (such as the first learning and the second learning). In one example, the apparatus can predict an acceleration curve of the head-hood impact of a new design of the car hood, without actually conducting the physical test or the crash simulation.

Figure 10:
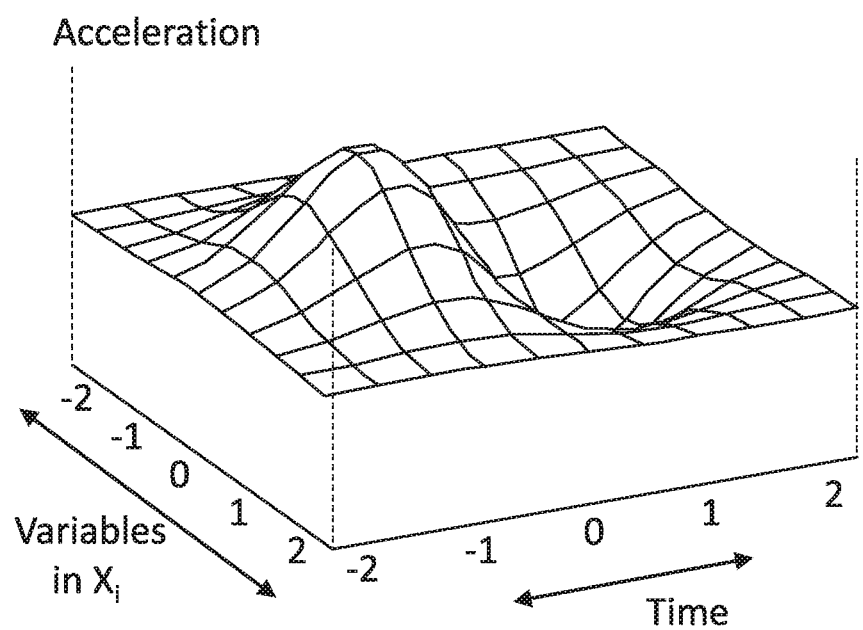
FIG. 10 shows one example of a response surface of an acceleration-time curve, according to an embodiment of the present invention.

FIG. 10 shows one example of a response surface of the acceleration-time curve. One axis in the graph in FIG. 10 corresponds to the acceleration value, another axis in the graph in FIG. 10 corresponds to the time, and the other axis in the graph in FIG. 10 corresponds to high level parameters derived from the simulation based on the physical structure data. The response surface may represent the estimation model generated by the second determining section, and a curve derived from the response surface by slicing the response surface in a plane of the time axis and the acceleration axis represents an acceleration-time curve.

The description in relation to FIGS. 1-10 mainly treats a car hood as the physical structure and an acceleration-time curve as the characteristic data. However, other implementations are also possible.

Figure 11:
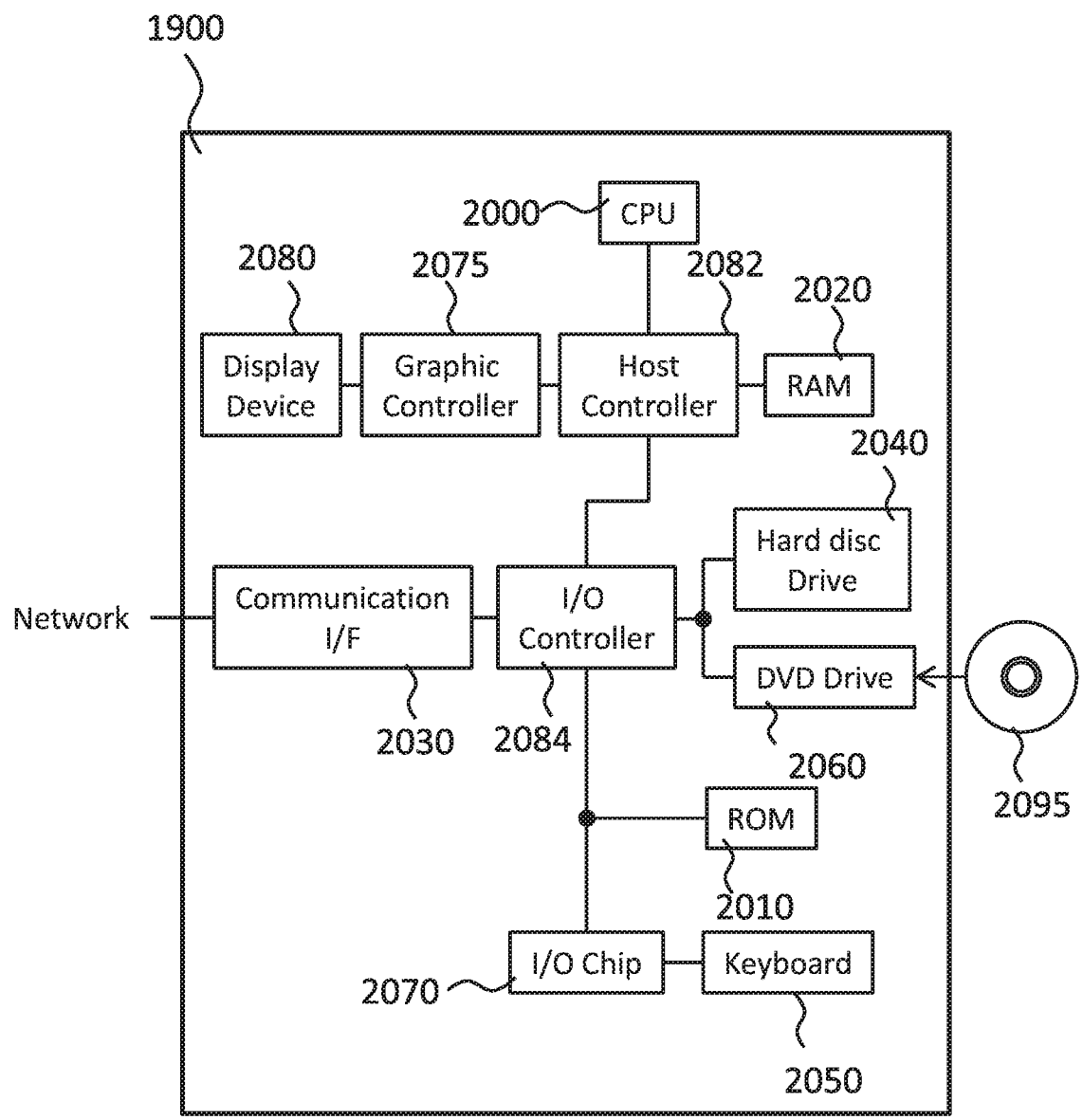
FIG. 11 shows a computer, according to an embodiment of the present invention.

FIG. 11 shows an exemplary configuration of a computer 1900 according to an embodiment of the invention. The computer 1900 according to the present embodiment includes a CPU 2000, a RAM 2020, a graphics controller 2075, and a display apparatus 2080, which are mutually connected by a host controller 2082. The computer 1900 also includes input/output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 may cause the computer 1900 to function as an apparatus, such as the apparatus 100 of FIG. 3. The program or module acts on the CPU 2000, to cause the computer 1900 to function as a section, component, element such as each element of the apparatus 100 of FIG. 3 (e.g., the obtaining section 110, the calculating section 130, the generating section 150, the predicting section 170, and the like).

The information processing described in these programs is read into the computer 1900 such as the apparatus 100 of FIG. 3, to function as the obtaining section, which is the result of cooperation between the program or module and the above-mentioned various types of hardware resources. Moreover, the apparatus is constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060(DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from a memory such as the RAM 2020, which includes various types of operations, processing of information, condition judging, search/replace of information, etc., as described in the present embodiment and designated by an instruction sequence of programs, and writes the result back to the memory such as the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which may implement the storage section, may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize an apparatus, a method, and a computer program product for predicting a target characteristic data.

What is claimed is:

1. An apparatus comprising:
   a processor configured to:
   model physical structures from physical structure data corresponding to discrete points distributed across each of a plurality of physical structures;
   estimate target characteristic data from a target physical structure data of a target physical structure of a vehicle by applying an objective function to characteristic data of at least one of the physical structures having a structural similarity to the target structure, the objective function identifying argument minimums for a loss function of a Gaussian weighted structural similarity multiplied by a weight vector; and
   output an estimated acceleration-time curve representing a response of the target structure to a physical interaction in a form of a collision based on the estimated target characteristic data,
   wherein the structural similarity is based on at least one characteristic similarity between characteristic data that corresponds with at least two of the physical structures in relation to a distance metric being within a distance threshold, and wherein the instructions further cause the processor to determine the structural similarity by using a tree model or a neural network model.

2. The apparatus of claim 1, wherein the instructions further cause the processor to calculate a characteristic similarity between a first characteristic data and a second characteristic data among the characteristic data, wherein the calculation is based on at least one difference between corresponding characteristic values of the first characteristic data and the second characteristic data.

3. The apparatus of claim 1, wherein each characteristic data includes at least one characteristic value among the plurality of characteristic values that represents a change of characteristic with respect to time.

4. The apparatus of claim 3, wherein each characteristic data includes at least one characteristic value among the plurality of characteristic values that represents a change of a characteristic relating to an impact against the corresponding physical structure, or a transformation of the corresponding physical structure.

5. The apparatus of claim 4, wherein each physical structure is a part of a body of a mobile object.

6. The apparatus of claim 3, wherein each physical structure data includes a feature for representing a location of the physical structure and time.

7. The apparatus of claim 1, wherein the instructions further cause the processor to determine a similarity function for estimating a new structural similarity, the determination based on at least one characteristic similarity between characteristic data that corresponds with the at least two physical structures.

8. The apparatus of claim 1, wherein the instructions further cause the processor to determine a weight of an estimated characteristic value to decrease a difference between the estimated characteristic value and a target characteristic value of a target characteristic data, wherein the estimated characteristic value is based on a composition of a plurality of structural similarities of the target physical structure data with each physical structure data.

9. The apparatus of claim 8, wherein the instructions further cause the processor to determine a sensitivity of the plurality of structural similarities of the target physical structure data with each physical structure data to decrease a difference between the estimated characteristic value and the target characteristic value of the target characteristic data, wherein the estimated characteristic value is further based on a composition of the plurality of relative positions between the target structure and each physical structure.

10. The apparatus of claim 9, wherein the instructions further cause the processor to determine the weight by using a kernel method.

11. The apparatus of claim 1, wherein the instructions further cause the processor to estimate characteristic data of a target physical structure by using the estimation model.

12. A computer-implemented method comprising:
   modeling physical structures from physical structure data corresponding to discrete points distributed across each of a plurality of physical structures;
   estimating target characteristic data from target physical structure data of a target physical structure of a vehicle by applying an objective function to characteristic data of at least one of the physical structures having a structural similarity to the target structure, the objective function identifying argument minimums for a loss function of a Gaussian weighted structural similarity multiplied by a weight vector; and
   outputting an estimated acceleration-time curve representing a response of the target structure to a physical interaction in a form of a collision based on the estimated target characteristic data,
   wherein the structural similarity is based on at least one characteristic similarity between characteristic data that corresponds with at least two of the physical structures in relation to a distance metric being within a distance threshold, and wherein the instructions further cause the processor to determine the structural similarity by using a tree model or a neural network model.

13. The computer-implemented method of claim 12, further comprising calculating a characteristic similarity between a first characteristic data and a second characteristic data among the characteristic data, wherein the calculation is based on at least one difference between corresponding characteristic values of the first characteristic data and the second characteristic data.

14. The computer-implemented method of claim 12, wherein each characteristic data includes at least one characteristic value among the plurality of characteristic values that represents a change of a characteristic with respect to time.

15. The computer-implemented method of claim 14, wherein each characteristic data includes at least one characteristic value among the plurality of characteristic values that represents a change of a characteristic relating to an impact against the corresponding physical structure, or a transformation of the corresponding physical structure.

16. A computer program product comprising one or more non-transitory computer readable mediums collectively including instructions that, when executed by the processor, cause the processor to:

model physical structures from physical structure data corresponding to discrete points distributed across each of a plurality of physical structures;

estimate target characteristic data from target physical structure data of a target physical structure of a vehicle by applying an objective function to characteristic data of at least one of the physical structures having a structural similarity to the target structure; and output an estimated acceleration-time curve representing a response of the target structure to a physical interaction in a form of a collusion based on the estimated target characteristic data, wherein the structural similarity is based on at least one characteristic similarity between characteristic data that corresponds with at least two of the physical structures in relation to a distance metric being within a distance threshold, and wherein the instructions further cause the processor to determine the structural similarity by using a tree model or a neural network model.

17. The computer program product of claim 16, wherein the instructions further cause the processor to calculate a characteristic similarity between a first characteristic data and a second characteristic data among the characteristic data, the calculation based on at least one difference between corresponding characteristic values of the first characteristic data and the second characteristic data.

18. The computer program product of claim 16, wherein each characteristic data includes at least one characteristic value among the plurality of characteristic values that represents a change of a characteristic with respect to time.

* * * * *